April 19, 1927.
P. G. FRAZIER
1,625,307
ROTARY VALVE STRUCTURE
Original Filed May 14, 1923    2 Sheets-Sheet 2
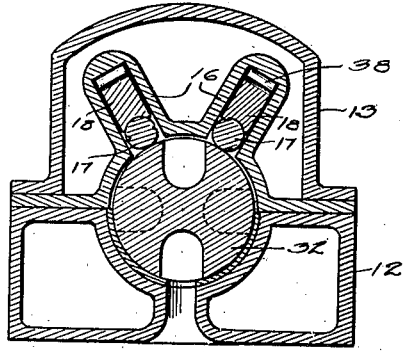
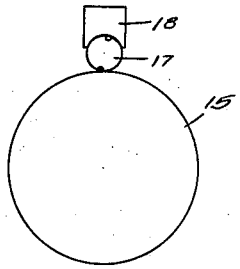
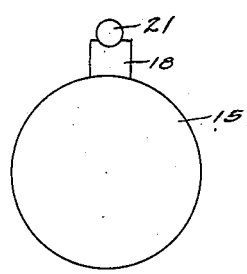
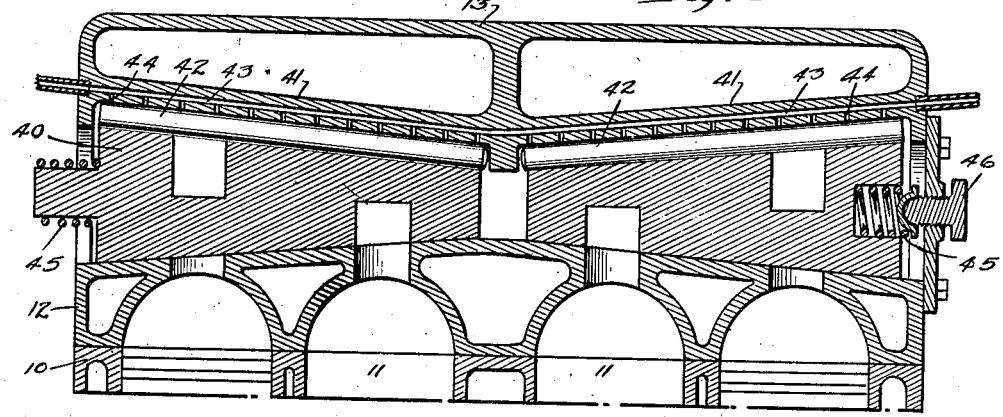
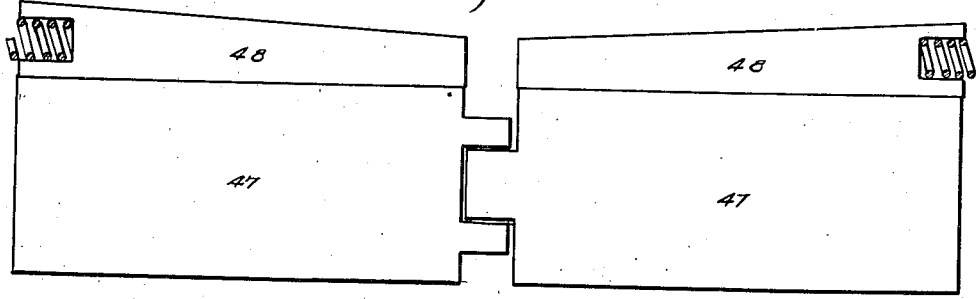

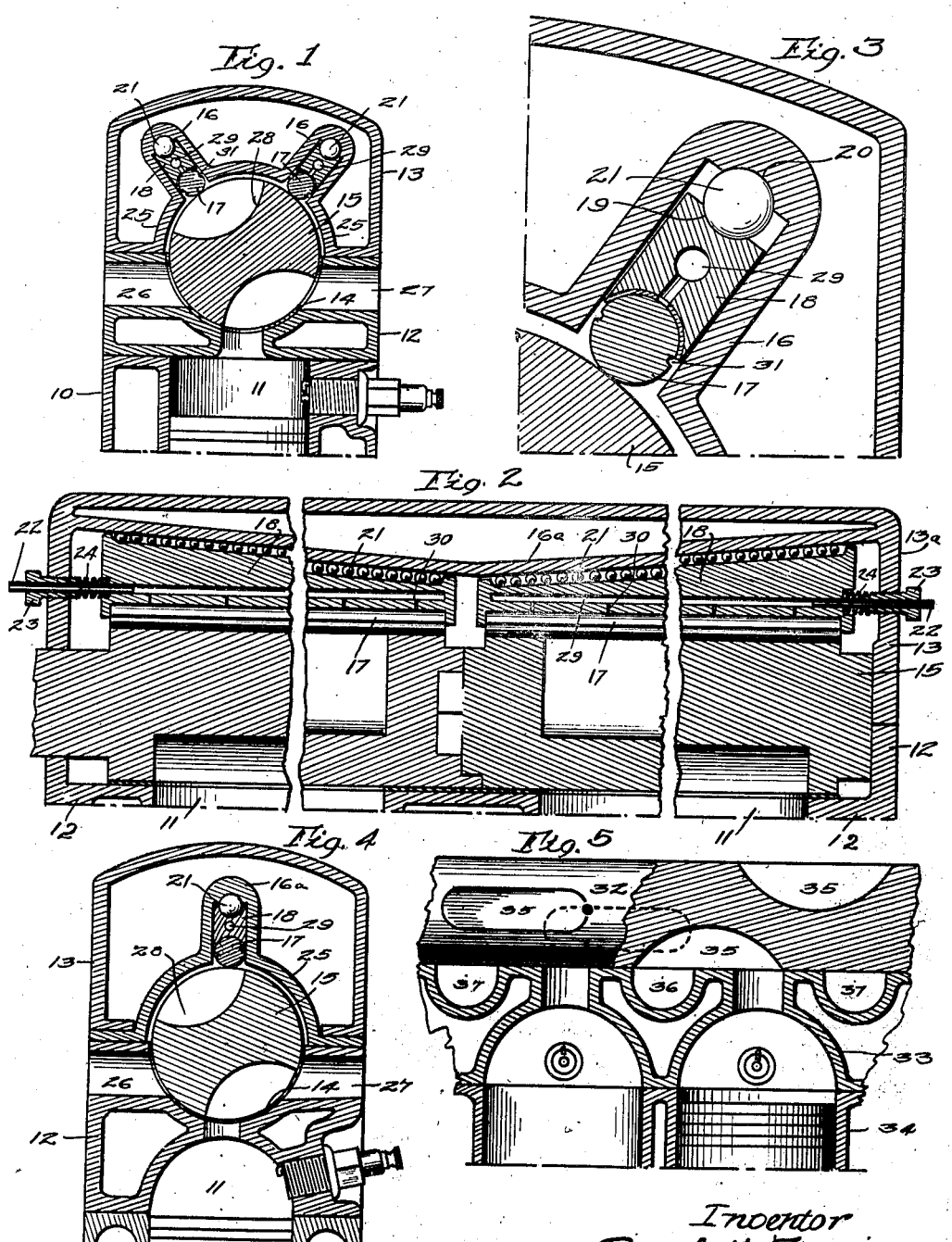

Patented Apr. 19, 1927.

1,625,307

UNITED STATES PATENT OFFICE.

PEARL G. FRAZIER, OF ANKENY, IOWA.

ROTARY-VALVE STRUCTURE.

Application filed May 14, 1923, Serial No. 638,815. Renewed June 10, 1926.

My invention has to do with a rotary valve and mounting therefor.

It is an object of my invention to provide a rotary valve structure of simple, durable and inexpensive construction for internal combustion engines.

A further purpose of my invention is to provide in a rotary valve structure an arrangement of parts, whereby the friction of the valve on its bearings is reduced to a minimum, and whereby adjustment of the parts is automatically accomplished for taking care of the expansion and contraction of the valve and adjacent parts and wear thereon.

A further object is to provide a rotary valve structure having a roller adjacent to the valve adapted to reduce friction and also to serve as a lubricant container.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a transverse, vertical sectional view through a valve structure embodying my invention.

Figure 2 shows a longitudinal, sectional view of the same, parts being broken away.

Figure 3 shows an enlarged, transverse sectional view through a portion of the valve and the bearing structure therefor.

Figure 4 shows a transverse, sectional view through a valve structure of slightly different form.

Figure 5 shows a longitudinal, sectional view through a different form of my rotary valve structure.

Figure 6 shows a transverse, sectional view through another form of my invention.

Figures 7 and 8 show diagrammatic views of other modified forms.

Figure 9 shows a vertical, longitudinal, sectional view through still another form of my invention; and Figure 10 shows a diagrammatic view of still another form in which my invention may be embodied.

It is my purpose to provide a valve structure of the type involving a rotary valve so arranged that there is a minimum of bearing surface engaging the upper half of the rotary valve and in which the openings which communicate with the openings in the valve during the rotation thereof are all arranged in the lower half of the valve.

In the accompanying drawings, I have shown in Figures 2 and 3, a form of rotary valve structure embodying my invention.

In the drawings, I have used the reference numeral 10 to indicate generally the engine block of the plural cylinder type having the cylinders 11.

The head comprises the lower casing member 12 and the upper casing member 13. The lower casing member 12 forms a bearing 14 for the rotary valve 15, as shown for instance in Figures 1, 2 and 3.

In the upper half 13 of the engine head, I have shown two bearing receiving members 16, extending longitudinally of the rotary valve 15.

In Figure 2, I have shown the upper engine head member 13$^a$ in which there is only one bearing receiving member 16$^a$ directly above the valve.

In the form of invention shown in Figures 1 and 3, the members 16 are spaced from each other as shown.

Received in each member 16 in engagement with the valve 15 is a roller 17 above which is a bar 18 shaped to fit the roller and tapered from end to end as illustrated in Figure 2.

The bearing 14 has a replaceable lining 14$^a$ and a bearing lining 17$^a$ is provided between the roller 17 and the bar 18.

The bar 18 is shaped to fit the roller 17 and has in its upper face a ball race 19. The upper wall of the receiving members 16 and 16$^a$ are inclined, as shown for instance in Figure 2, and in the under surface of each such upper wall is a ball race 20 for bearing balls 21.

The valve 15 may be made in sections, as shown for instance in Figure 2 or otherwise.

In Figure 2, I have shown two sets of rollers 17 and bars 18 arranged end to end, but one only may be employed.

At the larger end of each bar 18, an oil feed pipe 22 is extended through the wall of the head member 13 or 13$^a$ through a plug 23 therein.

Seated between the plug 23 and the bar 18 is a coil spring 24 for holding the bar 18 at one limit of its movement.

Sufficient space is allowed in the member 16 to permit some longitudinal adjustment of the bar 18 to allow for contraction and expansion of the valve and adjacent parts.

The wall 25 of the upper head member 13 or 13ª is normally spaced from the valve 15, so that ordinarily the upper half of the valve bears against the roller or rollers 17 only.

Expansion of the valve causes the bar 18 to creep along the inclined wall 16ª, whereas upon contraction of the valve, the spring 24 will force the bar 18 in the opposite directions.

In Figures 1 and 2, I have shown in the lower engine head member 12 on opposite sides of the valve, intake and exhaust openings 26 and 27 for each cylinder.

In the valve, there is arranged a pair of passages 28 opposite each cylinder extending a sufficient length circumferentially of the valve, so that in one position of the valve, an opening or passage 28 affords communication between the passage 26 and its cylinder, and in another position, the same opening affords communication between the cylinder and the passage 27.

In Figure 4, I have illustrated the same form of valve as that shown in Figure 2. In each bar 18 is arranged longitudinally an oil passage 29 from which extend oil passages 30 downwardly to the roller 17.

In the roller 17 are grooves 31 arranged longitudinally.

Oil is supplied to the valve through the pipe 22, the passage 29, the passages 30 and the grooves 31.

The upper portions of the lining may be slightly cut away from the true circumference of the valve in order that the expansion of the valve will not cause it to bind.

It will be noted that the upper valve head 13 may be removed without removing the lower head 12, and that the bearing 25 is a separate element, to which access is easy.

In Figure 5, I have shown a slightly different arrangement of the intake and outlet passages. I have indicated the valve in Figure 5, by the numeral 32 and the lower valve head by the numeral 33.

The valve head member 33 sets on the engine block 54. The valve 32 is provided with openings 35 extending longitudinally of the valve.

In the lower part of the head member 33 and below the lowermost part of the valve are inlet and exhaust passages 36 and 37. The openings 35 are so arranged that in one position of the valve, an opening 35 affords communication between the head of the cylinder and the inlet passage 36, while in another position of the valve, another opening 35 affords communication between the cylinder head and the exhaust passage 37.

In Figure 6, there is illustrated another modified form of my invention in which the valve 32, such as shown in Figure 5, is employed.

The bearing for the upper part of the valve is similar to that shown in Figure 1 with the exception that rollers 38 are employed instead of the balls 21.

In Figures 7 and 8, I have shown diagrammatic views illustrating certain possible modifications of the bearing structure at the upper part of the rotary valve.

In Figure 7, there is illustrated the roller 17 and the tapered bars 18 without the use of the balls 21.

In Figure 8, I have shown the roller 17 omitted with the bar 18 bearing directly against the valve and having the ball bearings above it.

In Figure 9 is shown still another form of my invention in which the rotary valve is tapered and a straight roller of the same diameter throughout is arranged above the valve.

In the form of my invention illustrated in Figure 9, there is shown the engine block 10, the lower head member 11 and the upper head member 12, such as have already been described.

In the form of the invention shown in Figure 9, I have shown a rotary valve 40 of the tapered type and have illustrated two of such valves arranged with their smaller ends slightly spaced from each other, each valve being designed to take care of two cylinders.

Of course, the structure may be changed in regard to matters of proportion and size.

Above each tapered valve 40 is a bearing receiving member 41, similar in purpose to the member 16 and inclined from end to end to correspond to the tapering shape of the valve 40.

Received in the member 41 above each valve 40 is a roller 42 bearing against the upper face of the valve 40 as shown.

In the upper wall of the member 41 is an oil passage 43 from which oil passages 44 lead to the interior of the member 41 for supplying oil to the roller 42 and thence to the valve 40.

The valves 40 have their play in their bearings and are spring-pressed toward their smaller ends by means of coil springs 45 and adjustable plugs 46 or the like.

In Figure 10, there is shown a form of my invention, in which the rotary valve 47 is of uniform diameter, but the upper half thereof bears against a roller 48 tapered from end to end and spring-pressed toward its smaller end.

I have in my valve and bearing structures herein described provided a structure for accomplishing the desirable purposes mentioned heretofore herein.

It will be seen that in the forms of my invention disclosed in all of the figures, except Figure 8, the upper half of the rotary valve contacts only with rotary members, so that the friction of said valve with the bearings above it is reduced to a minimum.

Even in the form of the invention shown in Figure 8, the bearing bar engages only a small part of the surface of the rotary valve.

I have also made provision for taking care of expansion and contraction. It will be noted that in Figures 1 and 3, I have shown above the cylinders of the engine, a rotary valve of uniform diameter, having above it a head provided with two spaced chambers or receptacles or bearing devices, and have shown in each of said chambers 16 a roller 17 bearing against the valve 15 and backed by a bar 18 tapered from end to end. Above the bar 18 are the bearing rollers 21.

The bar 18 is spring-pressed toward the smaller part of the casing in which it is received.

In Figures 2 and 4, there is shown a similar construction with the exception that only one casing 16ª located immediately above the valve is shown instead of two casings as in Figures 1 and 3.

In the form of invention shown in Figures 1 to 4 inclusive, friction is reduced to a minimum by the use of the rollers 17.

There is also provided an oiling system wherein oil is supplied through the tapered bar 18 to the roller 17 and thence to the rotary valve.

The expansion of the rotary valve and adjacent parts is taken care of by the construction and method of mounting or supporting the tapered bar 18.

As the valve 15 expands, the tapered bar will be made to creep toward the larger end of the casing in which it is received. This movement is made easy by the balls 21 and is against the tension of the spring 24.

When the valve contracts, the pressure of the spring 24 forces the tapered bar 18 in the opposite direction, so that the roller 17 is kept in snug contact with the rotary valve.

While the tapered bar may creep gradually longitudinally, yet when in any of its adjusted positions, it will not give suddenly when the rotary valve is subjected to pressure from the cylinder during the explosion or compression strokes.

In Figure 6, the construction is similar to that already described, the structure there differing from that of Figures 1 and 3 only in that rollers are substituted in the structure of Figure 6 for the balls 21 of the structure of Figures 1 and 3.

The modifications of Figures 7 and 8 have already been explained.

In Figure 9 is shown another form of my invention in which the spring-pressed tapered rotary valves are employed in combination with longitudinally arranged rollers above the valves as illustrated.

The valves can creep slightly in their tapered bearings to make allowance for contraction or expansion and are spring-pressed to set snugly.

In Figure 10, there is still another modification of my invention in which the tapered rollers 48 are held spring-pressed in position above the rotary valves 47.

It will be noted that in each form of my invention, the construction is such that the valve may be timed to turn at only one quarter the speed of rotation of the crank shaft. This reduces friction and heating of the valve. This structure and the arrangement of the valve passages makes it possible for each piston to go through two complete cycles of operations, or eight strokes on each revolution of the valve. The valve can thus move slowly enough to allow ample time for intake and scavenging.

It will be understood that in all the forms shown herein, the upper half of the valve is free from bearing contact, except with the bearing devices herein particularly explained.

The chamber above the valve is spaced from the valve somewhat, so as to allow for expansion and contraction as herein explained.

It will be noted that there are certain common features running through the various forms of my invention.

I have provided a structure in which the intake and exhaust openings are arranged to register with some part of the lower half of the valve, preferably substantially below the central, horizontal plane thereof, and this arrangement is combined with a structure in which the upper half of the valve is normally free from contact with the casing in which it is received and is yet firmly engaged by bearing devices such for instance as the rollers 17.

The construction reduces the friction on the valve to a minimum, allows for expansion and contraction, and permits the provision of suitable structure for lubrication.

While I have illustrated my invention as applied to an engine of the internal combustion type, I do not want to confine myself to the use of the valve with that particular type of engines, insomuch as it may be used with steam or other engines.

It will be noted that the rollers, such for instance as the roller 17, provide a lubricating device of peculiar value in a rotary valve structure. Oil is carried to the rotary valve by the roller whenever the valve is operating, and no oil is conducted to the valve when the valve is stationary.

When the passages or openings 28 are adjacent to the roller, no oil can be sucked to the valve on account of the partial vacuum in the engine cylinders, regardless of where the rollers are located with relation to the circumference of the valve. The oil is furnished to the valve according to the speed at which it is rotated.

Some changes may be made in the construction and arrangement of the various parts of my improved rotary valve structure without departing from the real spirit and purpose of my invention, and it is my intention to cover by my application any modifications of structure of use of mechanical equivalents, which may be reasonably included within their scope of my invention.

I claim as my invention:

1. In a rotary valve structure, a casing, a rotary valve mounted therein, the casing above the valve being spaced therefrom, a rotary anti-friction device mounted in engagement with the upper part of the valve for a substantial portion of its length, said structure having means for supplying oil to the anti-friction device for thereby oiling the valve.

2. In a rotary valve structure, a casing, a rotary valve mounted therein, a roller mounted for engagement with the valve for a substantial portion of its length, adapted to be rotated in unison with the valve, said structure having means for supplying oil to the roller, whereby oil will be supplied to the valve by the rotation of said roller.

3. In a rotary valve structure, a casing, a rotary valve mounted therein, a roller mounted for engagement with the valve for a substantial portion of its length adapted to be rotated by the rotation of the valve, said structure having means for supplying oil to the roller, whereby oil will be supplied to the valve by the rotation of said roller.

4. In a rotary valve structure, a casing, a rotary valve mounted therein, a roller mounted for engagement with the valve for a substantial portion of its length, adapted to be rotated in unison with the valve, a bar bearing against said roller, having means for conducting oil thereto substantially along the entire length thereof, whereby oil will be furnished by the roller to the valve according to the speed of operation of the valve.

5. In a rotary valve structure, a casing, a rotary valve mounted therein, a roller mounted for engagement with the valve for a substantial portion of its length, adapted to be rotated in unison with the valve, a bar bearing against said roller, having means for conducting oil thereto substantially along the entire length thereof, whereby oil will be furnished by the roller to the valve according to the speed of operation of the valve, one of said last three elements being tapered and having yielding longitudinal adjustment for taking care of expansion and contraction.

6. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, one of said elements being tapered from end to end to permit adjustment for wear or expansion or contraction by longitudinal movement thereof.

7. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, one of said elements being tapered and mounted for longitudinal sliding movement in the casing.

8. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, being tapered from end to end and one of said elements being provided with a spring pressure device for yieldingly pressing it in one direction longitudinally.

9. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, one of said elements being tapered from end to end and capable of longitudinal sliding movement in the casing, and a spring device for yieldingly imparting longitudinal pressure on said last-described element.

10. In a rotary valve structure of the class described, the combination of a suitable casing, a rotary valve mounted therein, said casing having inlet and outlet openings registering with the lower half of the valve, said valve having passages for registering with said openings in certain positions of the rotation of the valve, the casing above the valve being normally spaced therefrom, a bearing element in said casing above the valve engaging a small portion of the surface of the valve, one of said elements being tapered and provided with a spring pressure device for yieldingly pressing it longitudinally in one direction.

11. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, a bearing element above said anti-friction element, one of said elements being tapered, and mounted for longitudinal sliding movement, for allowing for contraction and expansion, and being provided with a spring pressure device for yieldingly pressing it in one direction longitudinally.

12. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, a bearing element above said anti-friction element, one of said elements being tapered, and mounted for longitudinal sliding movement for allowing for contraction and expansion, and being provided with a spring pressure device for yieldingly pressing it in one direction longitudinally.

13. In a rotary valve structure of the class described, a suitable casing, a rotary valve element mounted in said casing, said casing having intake and outlet openings registering with the lower part of the valve, said valve having passages for registering with said openings in different positions of the valve, the casing above the valve being spaced therefrom, a rotary anti-friction element mounted in the casing above the valve bearing against the valve, a bearing element above said anti-friction element, one of said elements being tapered, and mounted for longitudinally sliding movement, for allowing for contraction and expansion, and being provided with a spring pressure device for yieldingly pressing it in one direction longitudinally and antifriction devices above said third of said element for reducing the friction thereof on its longitudinally movement.

PEARL G. FRAZIER.